July 23, 1968 T. D. CLARK 3,394,030

METHOD OF VAPOR DEPOSITING OF SUPERCONDUCTIVE FILM FOR CRYOGENIC DEVICES

Filed Oct. 26, 1964

INVENTOR

TERENCE D. CLARK

BY

Frank R. [signature]

AGENT 3,394,030
METHOD OF VAPOR DEPOSITING SUPERCONDUCTIVE FILM FOR CRYOGENIC DEVICES

Terence Daniel Clark, Lewes, Sussex, England, assignor to North American Philips Co., Inc., New York, N.Y.

Filed Oct. 26, 1964, Ser. No. 406,617
Claims priority, application Great Britain, Oct. 25, 1963, 42,217/63
6 Claims. (Cl. 117—212)

The present invention relates generally to cryogenic devices and more particularly to methods of producing them.

At least 22 elements and a number of alloys are superconductive at temperatures approaching 0° K. Some of the alloys are formed from, or include, elements which are not separately superconductive. The commonly used superconductors are aluminum, lead, niobium, tantalum, tin, titanium and vanadium, all of which become superconductive below 8° K.

A theory to explain superconductivity was published in 1957 by J. Bardeen, L. N. Cooper and J. B. Schrieffer in Physical Review, No. 108, page 1175. Since then a considerable amount of work has been done in this field and it has been found that electron tunneling takes place between superconductors separated by a thin enough barrier.

Figure 1:
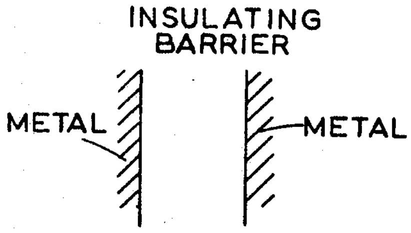
Figure 2:
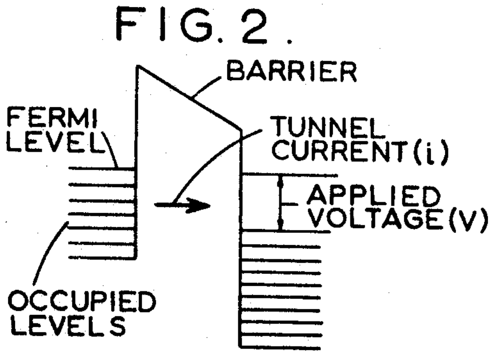

If two superconductors of the same material are separated by a gap of less than approximately 100 A., so as to form a symmetric junction as shown in FIGURE 1 of the drawing, and a potential is applied across the gap a tunneling current will flow. FIGURE 2 of the drawing shows the relationship between the energy levels of the arrangement shown in FIGURE 1 of the drawing, and, FIGURE 3 of the drawing shows the idealized current/voltage characteristic for a superconductive tunneling junction.

Figures 4, 5, 6:
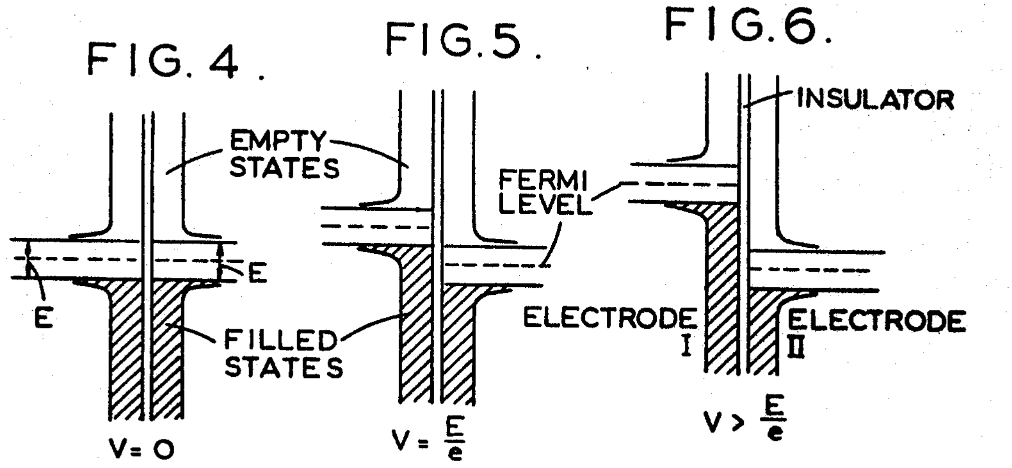

FIGURES 4, 5 and 6 of the drawing show the relationship between the electron density of states and energy spectrum for a superconductor tunneling junction at $T=0°$ K. and across which a potential is applied. The density of states is bunched up on each side of the energy gap which is itself symmetrical about the Fermi level. If one of the electrodes is biased with respect to the other then no current will flow until the electrons in the filled states of the first electrode can tunnel into the empty states of the second. That is to say a bias voltage across the junction has to be equal to or greater than $E/e$ for conduction to take place, where E is the energy gap in the superconductor and $e$ is the electronic charge.

Figure 3:
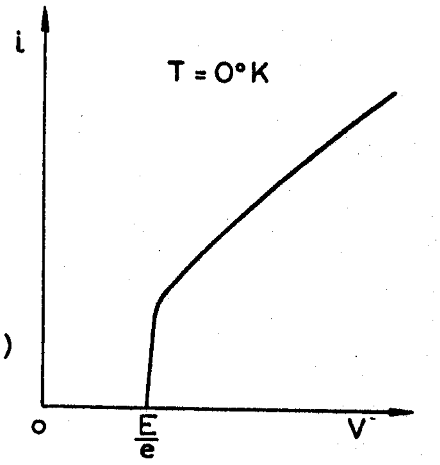

FIGURE 3 of the drawing shows the sharp discontinuity in the tunneling current when $V=E/e$ and also how, as the bias voltage increases beyond $E/e$, the rate of increase of current decreases.

FIGURE 6 of the drawing shows how the high density of filled states in one electrode moves away from the high density of states in the other electrode with increasing potential difference.

A device having a current/voltage characteristic as shown in FIGURE 3 of the drawing can be used as a relay or, if suitably biased, as an amplifier.

Symmetric junctions have been either difficult to manufacture or have had other technical disadvantages. It has been found that junctions of barium stearate between either lead or tin electrodes are not easily reproducible and tend to be unstable. $Al/Al_2O_3/Al$ junctions are stable but the low critical temperature of aluminum $$(Tc=1.2° \text{ K.})$$

tends to make devices incorporating such junctions impracticable.

It is advantageous to use a metal whose energy gap E is much larger than $kT$ at the temperature of operation of the device. A suitable metal is lead ($Tc=7.2°$ K.) with a large energy gap ($E(o)\simeq 2.5$ mev.) and which is easy to evaporate. For lead at 3° K., $E/kT\simeq 10$, and at this temperature lead has almost its full gap.

According to the present invention a cryogenic device includes a thin striated discontinuous superconductive film in which the distance between the discontinuous superconductive regions in a given direction is small enough to permit tunneling of electrons between the regions in said given direction, and in which the distance between discontinuous superconductive regions in a direction at right angles to the given direction is greater than said distance between regions in the given direction.

According to a further feature of the present invention a method of producing by vapor deposition a discontinuous thin film on an electrically-insulating substrate for a device according to the invention includes the steps of placing the substrate in a position such that the particles of superconductive material to be laid down on the substrate approach one surface of the substrate in a preferred direction and at a high angle of incidence to said surface so that said surface is coated with a striated discontinuous thin film in which the distance between the superconductive regions is generally less than 100 Angstroms at right angles to the preferred direction and generally greater than 100 Angstroms in the preferred direction.

Figure 7:
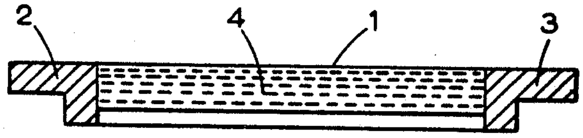

One embodiment of the invention and a preferred method of producing it will now be described with reference to the accompanying drawing in which FIGURE 7 shows diagrammatically a two terminal cryogenic device.

Referring now to the drawing FIGURE 7 shows an electrically-insulating substrate 1, a terminal 2 and a terminal 3 between which there is a discontinuous thin superconductive film 4 of, for example, a type II superconductor.

Metal atoms which have been evaporated on to a substrate have some degree of mobility and because of this tend to agglomerate on the surface of the substrate so forming islands. As more material is deposited so the islands grow in size and thickness until eventually they coalesce to form a continuous film. Very thin metal films can therefore be produced so as to form a planar array of many small discrete islands. If the average spacing between these islands is small enough (<100 A.) then the film can conduct electricity due to electrons tunneling, under the action of the field, from one island to the next. Vapor deposition apparatus is generally constructed so that the metal atoms arriving at the substrate approach the surface of the substrate normally, that is to say along paths perpendicular to the surface of the substrate.

The current-voltage characteristics of discontinuous films changes considerably when the metal becomes a superconductor. In this case electron tunneling between the agglomerates does not occur until the applied voltage across each pair of islands along any path of conduction became $\geqslant E/e$.

Hence, for a regular array of evenly spaced islands this threshold voltage for the film would equal $n.E/e$, where $n$ is the number of tunneling barriers along the path of conduction. However, for an irregular array of islands, not equally spaced, as is found for these discontinuous films the situation becomes much more complicated and the current tends to take random paths across the film. As the islands are not evenly spaced each pair would have a slightly different threshold field from the others and this would spread out the transition from the non-conducting to the conducting state and the conduction threshold would no longer be sharp.

The discontinuous thin film 4 is laid down on the substrate 1 by evaporating the lead on to the substrate at a high angle of incidence. The crystallites in the plane of the film become orientated at right angles to the incident beam so forming chains of agglomerates at right angles to the incident beam. By controlling the deposition rate, agglomerate thickness and substrate temperature the inter island distance can be controlled. As the film is produced on the substrate the following sequence of steps will be seen. Initially the metal atoms arriving at a high angle of incidence to the surface of the substrate move freely over the surface and as more atoms arrive the superconductive metal being deposited tends to agglomerate and form an irregular array of islands. As further atoms arrive at the surface of the substrate the islands increase in height faster than they increase in diameter and due to the high angle of incidence of deposition the islands tend to form a shadow effect preventing the incident beam from depositing on the material immediately behind the island. The metal atoms which directly strike the islands have a high surface mobility and tend to move at right angles to the incident beam and to come to rest at the ends of the island. This means that the island becomes elongated in a direction at right angles to the incident beam. Due to the initial random spacing of the islands and their elongated form a discontinuous film is produced so that the distance between the islands in the direction of the incident beam is greater than the distance between the islands at right angles to this. If the substrate is maintained above the melting point of the material to be deposited this will cause the surface mobility of the atoms on the substrate to be greater than if the substrate were maintained at a temperature below the melting point. However, it will be appreciated that due to the surface tension of the material forming the islands if the temperature of the substrate is considerably greater than the melting point of the material then the islands will tend to be formed as part spherical islands. It is therefore preferable to maintain the temperature of the substrate substantially at the melting point of the material to be deposited so as to maintain an elongated form of the islands and also to allow sufficient mobility of the atoms on the surface of the substrate for a discontinuous film to be produced. It will also be appreciated that as the angle of incidence of the material approaches the plane of the surface of the substrate the shadow effect of the islands will be increased and so the distance between adjacent chains of islands will also be increased. The control is sufficient to produce a striated thin discontinuous film in which the distance between adjacent islands in a chain is less than the distance between chains.

The device as shown in FIGURE 7 of the drawing may be used as a high impedance superconductive relay, or, if a suitable bias potential is applied between the electrodes 2 and 3 the device may be used as an amplifier. The device shown in FIGURE 7 may be connected so that the electrode 2 is coupled to the positive terminal of a current supply source and also to one terminal of a detecting means such as a meter. An electrode 3 is coupled to the negative terminal of the current source and also to the other terminal of the detecting device. When the superconductive film 4 is in the superconducting state the full potential of the constant current source will be applied across the terminals of the detecting device. However, when the film 4 is in the normal phase a tunneling current will flow between the electrodes 2 and 3 and a proportion of the voltage of the constant current source will then be applied to the detecting device. If the device as shown in FIGURE 7 is connected to a variable voltage source it can then act in a similar manner to a Zener diode so that when the voltage exceeds the value $E/e$, as shown in FIGURE 3, current will flow through the device.

The device will only conduct if the potential applied between the electrodes 2 and 3 is equal to, or greater than the threshold voltage. The threshold voltage is determined by the interisland potential necessary to allow tunneling multiplied by the number of interisland gaps in a chain. Because the interisland distance along a chain is less than the distance between chains, the conduction between electrodes 2 and 3 will be limited to conduction along the chains so preventing tracking across the discontinuous film. The spread in the threshold voltage can be made small by preventing tracking.

As electron tunneling is very fast, the switching speed of a device as shown in FIGURE 7 is also fast as the impedance of the device is high and hence the $L/R$ time constant of the device is small.

The discontinuous film may be provided with terminals by vapor deposition through a mask in a known manner. The terminals may consist of a material which is superconductive at the operating temperature of the device. In a device having a discontinuous film 1 cm. square and a uniform potential applied between a pair of opposite sides of the square the device may have an impedance of the order of 10 to 100 kilohms in the normal phase and a substantially infinite impedance in the superconducting phase. The range of voltage which may be applied across the film may be in the order of 10 to 100 volts. The characteristics of the film are largely dependent upon its structure and the distance between adjacent islands and it is preferable to maintain the distance between adjacent islands less than 100 A. The thickness of the film is in the order of 100 to 5,000 A. The discontinuous film and the terminals may be covered by a layer of silicon monoxide approximately 5,000 A. thick. The device may also be provided with a ground plane which may be made of a material which is superconducting at the operating temperature of the device.

The discontinuous film may be deposited on a substrate which has previously been coated with a nucleating layer in a pattern which will encourage the superconducting material to be deposited to form regular chains of agglomerates. The nucleating layer can be laid down through a mask in a known manner. The mask should be in the form of a number of narrow parallel slots. Preferably the slots are straight. In this case the superconducting material forming the chain of agglomerates may be deposited at a normal angle of incidence that is to say perpendicular to the surface of the substrate. The distance between the slots in the mask through which the nucleating layer is laid down should be greater than the distance between agglomerates of the superconducting material. By this means the current paths between the terminals of the device are regular and no tracking occurs. The superconducting material laid down on the substrate can have any form of outline but when laid down under normal angle of incidence the outline will be substantially circular.

The substrate may be machined so that the surface discontinuities form receptive areas on which the mobile metal atoms on the surface of the substrate tend to coagulate. The machining of the substrate can be arranged so that the receptive areas form parallel lines so that the discontinuous film follows this pattern. The term machining of the substrate is intended to cover the cutting of a crystal substrate so as to produce receptive areas. The surface of the substrate may be in the form of steps or corrugations. The term machining also covers the case where the substrate is subjected to an electron beam which is traversed over the surface of the substrate in a regular pattern so as to produce lines of receptive areas.

What we claim is:

1. A cryogenic device comprising a single electrically-insulating substrate portion, on the said substrate portion a thin striated discontinuous vapor-deposited superconductive film composed of a two-dimensionally extended array of discrete elongated superconductive regions in which the distance between the discrete superconductive regions in a given direction is small enough to permit tunneling of electrons between the regions in said given direction, and in which the distance between discrete superconductive regions in a direction at right angles to the given direction is generally greater than said distance between said regions in the given direction and large enough to prevent tunneling of electrons between the regions in said right angle direction, said discrete superconductive regions having a length in the given direction which exceeds their width in the right angle direction, first means on the said substrate for electrically contacting in common plural discrete regions of said film extending in the said right angle direction, and second means on the said substrate for electrically contacting in common plural discrete regions of said film extending in the said right angle direction which are spaced apart in the given direction from the plural regions contacted by the first means.

2. A cryogenic device as claimed in claim 1 in which the contact means include a superconductive material.

3. A cryogenic device as claimed in claim 1 in which the distance between superconductive regions is generally between 25 A. and 100 A. in the said given direction, and greater than 100 A. in the said right angle direction.

4. A cryogenic device as claimed in claim 3 in which the thickness of the discontinuous superconductive film is between 100 A. and 5,000 A.

5. A method of making a cryogenic device by vapor depositing a superconductive material onto the surface of an electrically insulating substrate from a given direction at a high angle of incidence approaching grazing incidence to said substrate surface while maintaining the latter at an elevated temperature of the order of the material's melting point to coat the surface with an array of discrete superconductive islands which by their shadow effect on the substrate surface portions behind the islands cause the islands to become elongated in a direction at right angles to the incident material, and continuing the deposition until the spacing between the islands in the deposition direction is generally greater than 100 A. preventing tunneling in said direction but the spacing between the islands in the right angle direction is generally less than 100 A. to permit tunneling in said right angle direction in the resultant striated discontinuous thin film.

6. A method as set forth in claim 5 wherein electrodes are applied to areas of said thin film spaced apart in the said right angle direction by vapor deposition.

References Cited

UNITED STATES PATENTS

| | | | |
|---|---|---|---|
| 3,259,759 | 7/1966 | Giaever | 307—88.5 |
| 3,238,918 | 3/1966 | Radke et al. | 117—212 X |
| 3,113,889 | 12/1963 | Cooper et al. | 117—212 X |
| 3,058,852 | 10/1962 | Caswell et al. | 117—212 |

FOREIGN PATENTS

| | | |
|---|---|---|
| 234,402 | 7/1964 | Austria. |

ALFRED L. LEAVITT, *Primary Examiner.*

A. M. GRIMALDI, *Assistant Examiner.*